United States Patent [19]
Murphy

[11] Patent Number: 6,028,679
[45] Date of Patent: Feb. 22, 2000

[54] INTERNET GLOBAL AREA NETWORKS FAX SYSTEM

[75] Inventor: Frederick J. Murphy, Falmouth, Mass.

[73] Assignee: NetFax Incorporated, Germantown, Md.

[21] Appl. No.: 09/184,972

[22] Filed: Nov. 3, 1998

Related U.S. Application Data

[62] Division of application No. 08/555,911, Nov. 13, 1995.

[51] Int. Cl.[7] .................. H04N 1/00; H04N 1/32
[52] U.S. Cl. .................. 358/407; 358/442; 358/468; 358/440; 379/100.02; 379/100.09; 379/100.15
[58] Field of Search ................. 358/407, 402, 358/442, 468, 434; 379/100.01, 100.02, 100.09, 100.15, 100.16, 100.17; 380/30, 44, 49; 709/200, 227–231, 238, 245–247

[56] References Cited

U.S. PATENT DOCUMENTS

| | | | |
|---|---|---|---|
| 4,200,770 | 4/1980 | Helman et al. | 380/30 |
| 4,218,582 | 8/1980 | Hellman et al. | 380/30 |
| 4,405,829 | 9/1983 | Rivest et al. | 380/30 |
| 4,713,837 | 12/1987 | Gordon . | |
| 4,941,170 | 7/1990 | Herbst . | |
| 4,960,981 | 10/1990 | Benton et al. . | |
| 4,969,184 | 11/1990 | Gordon et al. . | |
| 5,091,790 | 2/1992 | Silverberg | 358/434 |
| 5,115,326 | 5/1992 | Burgess et al. . | |
| 5,122,950 | 6/1992 | Benton et al. . | |
| 5,127,048 | 6/1992 | Press et al. . | |
| 5,287,202 | 2/1994 | Kumarappan | 358/434 |
| 5,291,302 | 3/1994 | Gordon et al. . | |
| 5,339,156 | 8/1994 | Isbii . | |
| 5,384,835 | 1/1995 | Wheeler et al. . | |
| 5,404,231 | 4/1995 | Bloomfield . | |
| 5,406,557 | 4/1995 | Baudoin . | |
| 5,418,624 | 5/1995 | Ahmed . | |
| 5,452,289 | 9/1995 | Sharma et al. . | |
| 5,459,584 | 10/1995 | Gordon et al. . | |
| 5,479,411 | 12/1995 | Klein . | |
| 5,497,373 | 3/1996 | Hulen et al. . | |
| 5,513,126 | 4/1996 | Harkins et al. . | |
| 5,521,719 | 5/1996 | Yamada . | |
| 5,546,194 | 8/1996 | Ross . | |
| 5,550,649 | 8/1996 | Wong et al. . | |
| 5,552,897 | 9/1996 | Mandelbaum et al. . | |
| 5,555,100 | 9/1996 | Bloomfield et al. . | |
| 5,557,425 | 9/1996 | Hasegawa . | |
| 5,559,609 | 9/1996 | Yamada et al. . | |
| 5,559,611 | 9/1996 | Bloomfield et al. . | |
| 5,570,465 | 10/1996 | Tsakanikas . | |
| 5,574,571 | 11/1996 | Charbonnier . | |

(List continued on next page.)

FOREIGN PATENT DOCUMENTS

| | | | |
|---|---|---|---|
| 2139081 | 6/1996 | Canada . | |
| 242326 | 9/1996 | Japan . | |
| WO 91/01608 | 2/1991 | WIPO . | |
| 96/41463 | 12/1996 | WIPO | H04N 1/00 |
| WO 97/10668 | 3/1997 | WIPO . | |
| 97/22203 | 6/1997 | WIPO | H04N 1/32 |
| 97/26753 | 7/1997 | WIPO | H04N 1/00 |

OTHER PUBLICATIONS

"Multipurpose Internet Mail Extensions (MIME) Part Two: Media Types", Freed & Borenstein, Network Working Group Request for Comments: 2046, Nov. 1996.

Rose, Marshall T., "The Internet Message—Closing the Book with Electronic Mail", (Chapter 1), Prentice Hall, 1993.

Request For Comment (RFC) 1494 memo dated Aug. 1993.

*Primary Examiner*—Scott Rogers
*Attorney, Agent, or Firm*—Banner & Witcoff, Ltd.

[57] ABSTRACT

A method and apparatus for transmitting class 1, 2, or 3 fax image data streams over Internet Global Area Networks is shown. A first device converts local fax image data streams into electronic data streams, transmits the data stream over the network, to a second device at the remote fax machine which reconverts the electronic data to fax image data and prints it out on said remote fax machine.

41 Claims, 7 Drawing Sheets

U.S. PATENT DOCUMENTS

| | | | | | | |
|---|---|---|---|---|---|---|
| 5,594,225 | 1/1997 | Borvin . | | 5,805,298 | 9/1998 | Ho et al. ................................. 358/402 |
| 5,608,786 | 3/1997 | Gordon . | | 5,815,669 | 9/1998 | Lee et al. ........................... 395/200.68 |
| 5,739,919 | 4/1998 | Lee et al. ................................. 358/407 | | 5,828,468 | 10/1998 | Lee et al. ............................... 358/434 |
| | | | | 5,872,845 | 2/1999 | Feder ....................................... 380/49 |

… 
INTERNET GLOBAL AREA NETWORKS FAX SYSTEM

This application is a division of Ser. No. 08/555,911 filed Nov. 13, 1998.

This invention relates to a method and apparatus for transmitting facsimile images over remote networks and more particularly to an apparatus and method for transforming, transmitting, and receiving conventional class 1, 2, and 3 fax images and for receiving other electronic data on common class 1, 2, and 3 fax machines over Internet global area networks.

BACKGROUND OF INVENTION

In recent years the so called "Fax" machine has become a common device in businesses both large and small and also in many homes. In 1966 the so called Group or Class 1 standards where adopted and with that came the start of the present popularity of the device. Although it took about six minutes to transmit a single page and the resolution was poor it was a big improvement over mail especially for international communications. In 1978 Class 2 standards appeared followed in 1980 by the Class 3, which machines were much faster and had much better resolution. These latter machines take about 30 seconds to transmit a page of text.

Ubiquitous physical stand alone fax machines remain the norm today for every day transmission of written documents and images but lack the ability to directly connect to and send/receive such documents across Internet global area networks.

PRIOR ART

While fax machines are now thought of as universal all class 1, 2, and 3 machines are currently direct telephonic connection devices and as such acquire toll charges for their use over the telephone companies switches. This of course means that the sender must pay intrastate and interstate long distance toll charges for the time it takes to transmit the desired communication, which in a busy office can amount to hundreds of dollars a month and in an international company to many thousands of dollars. Todays common fax machines cannot communicate directly over internet global area networks nor can they receive electronic mail. Security of Internet global area networks communications also is currently difficult to achieve and ensure. The ability to definitively verify the identity of the sender of a fax transmission is often difficult if not impossible to achieve. Also if absolute security is required expensive encryption/decryption devices must be employed to communicate by fax over public telephone lines. Secure private lines can be used but are expensive and limited in the addresses that can be accessed.

The ability to choose when to receive fax transmissions and to decide which ones to print and which ones to discard is not readily available to the average fax user. Negotiating fax transmissions, particularly on a multi use single telephone line, often requires ancillary communications to achieve; i.e. telephone call to agree on when to "turn on the fax machine", priority, re-transmission on "busy", undeliverable, etc.

OBJECTS AND SUMMARY OF INVENTION

Accordingly it is an object of the present invention to provide a method and apparatus that overcomes these limitations of the prior art.

It is another object of the present invention to provide a method and apparatus for transmitting/receiving class 1, 2, and 3 fax images over Internet global area networks.

It is another object of the present invention to provide a method and apparatus for transmitting/receiving standard class 1, 2, and 3 fax images over the Internet.

It is another object of the present invention to provide a method and apparatus for transmitting/receiving class 1, 2, and 3 fax images in a highly secure and private manner.

It is a further object of the present invention to provide an economical device that can be easily connected to present class 1, 2, and 3 fax machines and that will enable them to communicate over internet global area networks.

It is a further object of the present invention to provide an economical device that can be easily connected to present class 1, 2, and 3 fax machines that provides a built in electronic mail agent and means for converting the fax image data stream to e-mail SMTP/MIME/MOSS format for transmission/reception over the Internet global area networks.

It is a further object of the present invention to provide a device that can easily be connected to class 1, 2, and 3 fax machines that allows e-mail to be printed out thereon.

It is a still further object of the present invention to provide a device that can be easily connected to standard class 1, 2, and 3 fax machines to convert the fax image data stream to a MIME enabled e-mail format for transmission/reception with similarly equipped fax machines and e-mail capable computer terminals over the Internet.

These and other and further objects of the present invention are accomplished in one embodiment of the present invention by a device having signal recognition means, a data store and forward buffer, conversion means, an electronic mail agent, management and output means, encryption/decryption means, and software for accomplishing the desired transmission of fax images over Internet global area networks.

DESCRIPTION OF INVENTION

Figure 1:
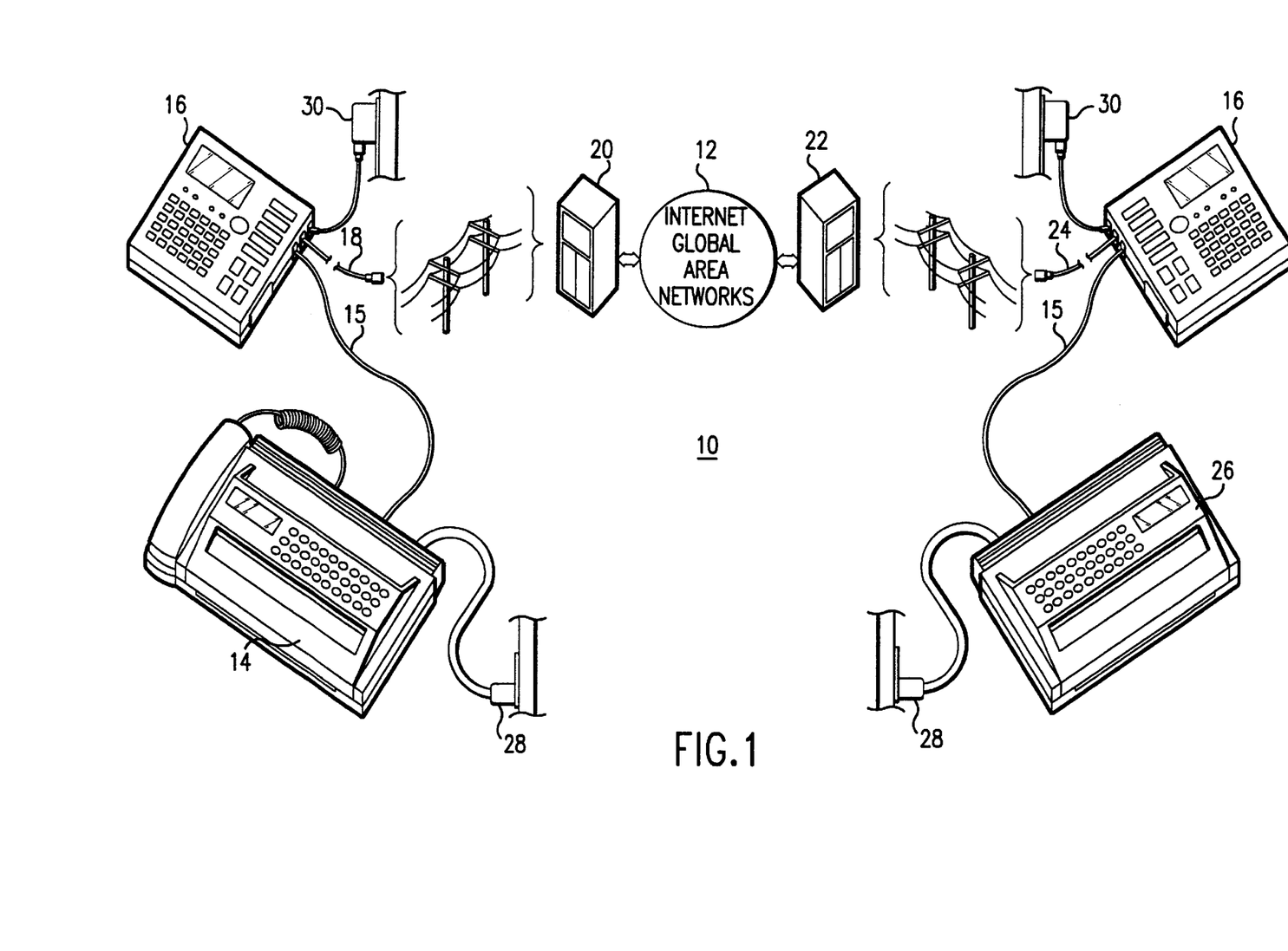
FIG. 1 is a pictorial view of a system according to the present invention.

Referring now to FIG. 1 there is shown a system 10 for transmitting/receiving a fax over the Internet global area networks 12. A local fax machine 14 is connected by line 15 to a signal manipulation device 16 which is in turn connected to a plain old telephone(POTS) line 18 which is terminated in an electronic mail agent server 20 such as a commercial or public server which in turn is connected to or resident on the Internet global area network 12. A remote electronic mail agent server 22 resident on the Internet global area networks 12 at a remote location is connected over a POTS line 24 to another device 16 which in turn is connected to a remote fax machine 26 by another line 15. Fax machines 14 and 26 can be any class 1, 2, or 3 fax machines currently available on the market and are connected to the usual domestic power source at 28. Devices 16 have their own power supplies 30 which convert the usual AC power to the appropriate voltages to power the various components within the devices 16 as will be described in detail herein.

Figure 2:
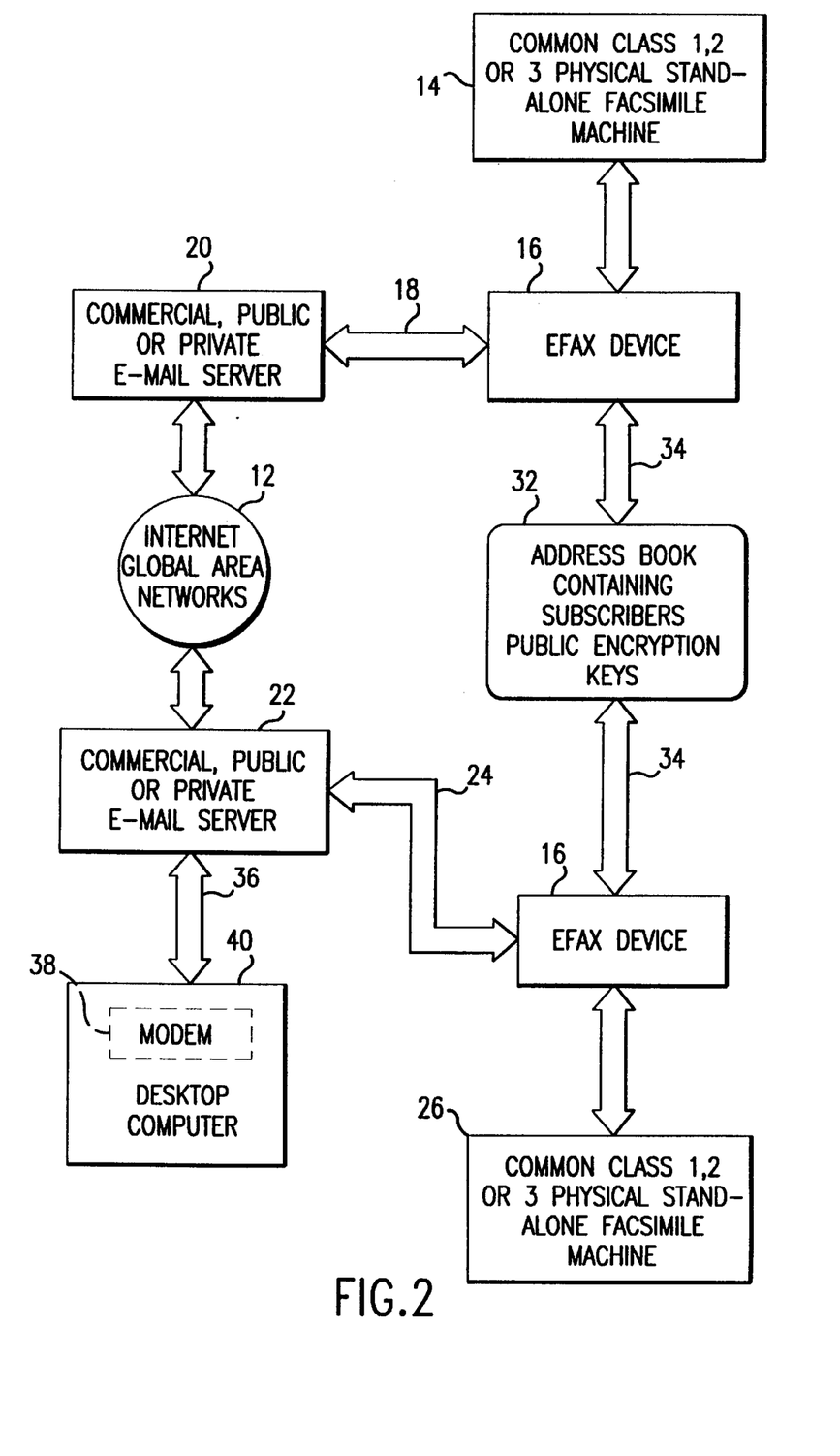
FIG. 2 is a functional block diagram of the system of FIG. 1.

FIG. 2 shows in block diagram form the system of FIG. 1 along with a privately accessible address book of public encryption keys 32 which may be accessed by direct dial up phone lines 34. In addition to the remote device 16 and fax machine 26 the remote agent server 22 may be connected by POTS line 36 to a modem 38 and computer 40 which can store and display the data stream available in the agent server 22.

Figure 3:
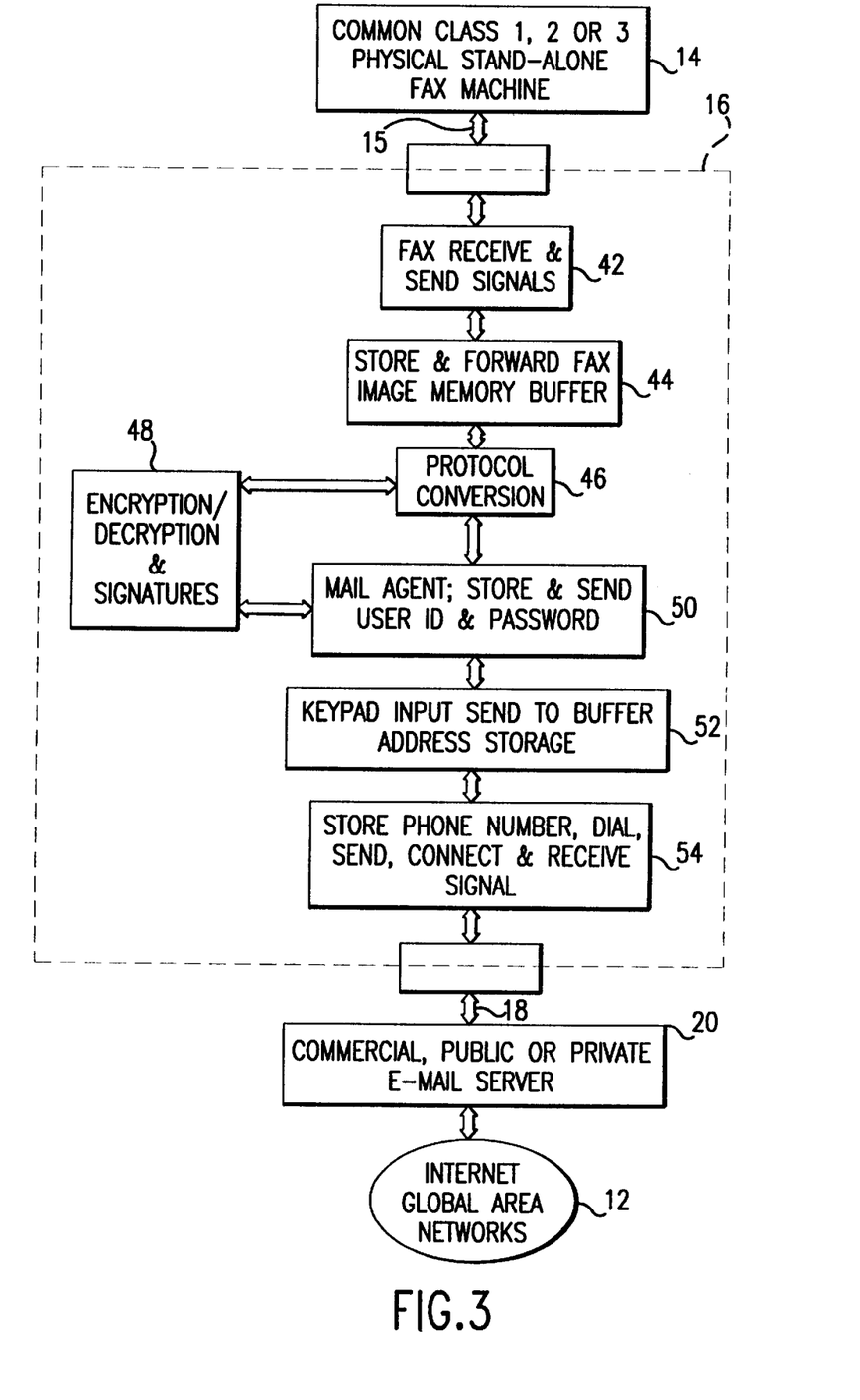
FIG. 3 is a detailed block diagram of the "user ecom" block of FIG. 2.

Referring now to FIG. 3 the signal manipulation device 16 is shown in detailed block diagram form. As will be described herein device 16 takes the fax image data stream and converts it into an e-mail compatible format for transmission over the Internet global area network 12. Device 16 will henceforth be called 'ecom' 16. This, along with the necessary management of the entire procedure, is accomplished in one embodiment by the device of FIG. 3.

When fax machine 14 initiates a call the ecom 16 responds as if it were the remote fax machine called by fax 14. The usual handshake and identification information is exchanged by recognition box 42 and when confirmed passed to the store and forward buffer 44. From here the data stream will be sent to the various other functions within ecom 16 in accordance with the instructions in box 42. Data compression/decompression is usually accomplished while the data is in buffer 44 also. Next the native facsimile data stream is converted into electronic mail (e-mail)format in box 46. Image compression including JPEG, GIF, and TIFF; audio and video compression such as MPEG; and e-mail extender such as MIME/MOSS are also accomplished, at this time. If encryption is indicated the converted data stream is directed to encryption/decryption block 48 for coding as will be described later. If coding is not indicated the data stream is passed to electronic mail agent 50 which performs store/send/user/password identification functions as necessary to interface with the selected server 20. Electronic mail agent 50 preferably is a commercial mail agent but it may be any public or private mail agent. In one embodiment both commercial and public electronic mail agents are provided.

Figure 8:
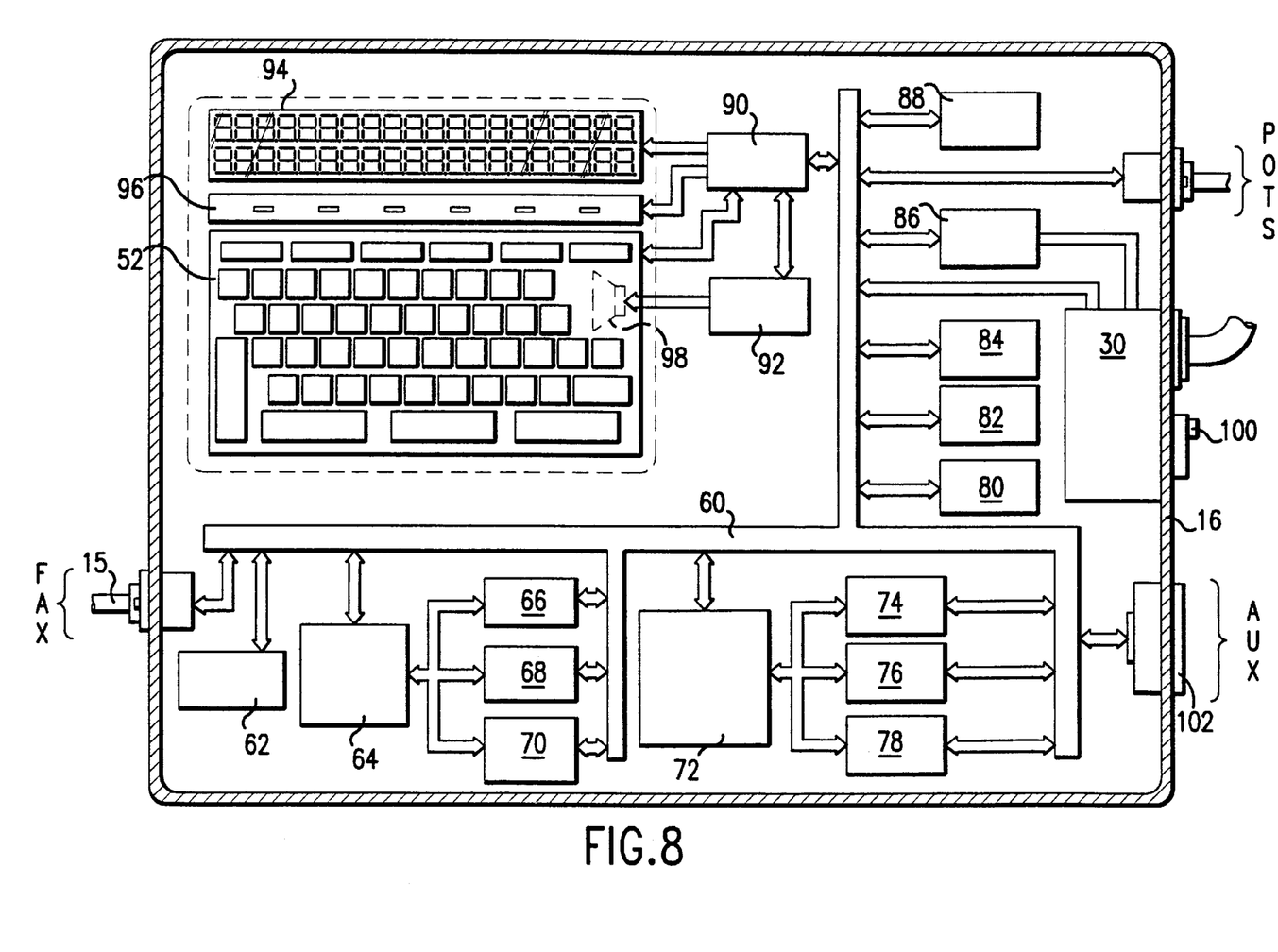
FIG. 8 is a detailed block diagram of an embodiment of the present invention showing the functional components thereof.
Figure 9:
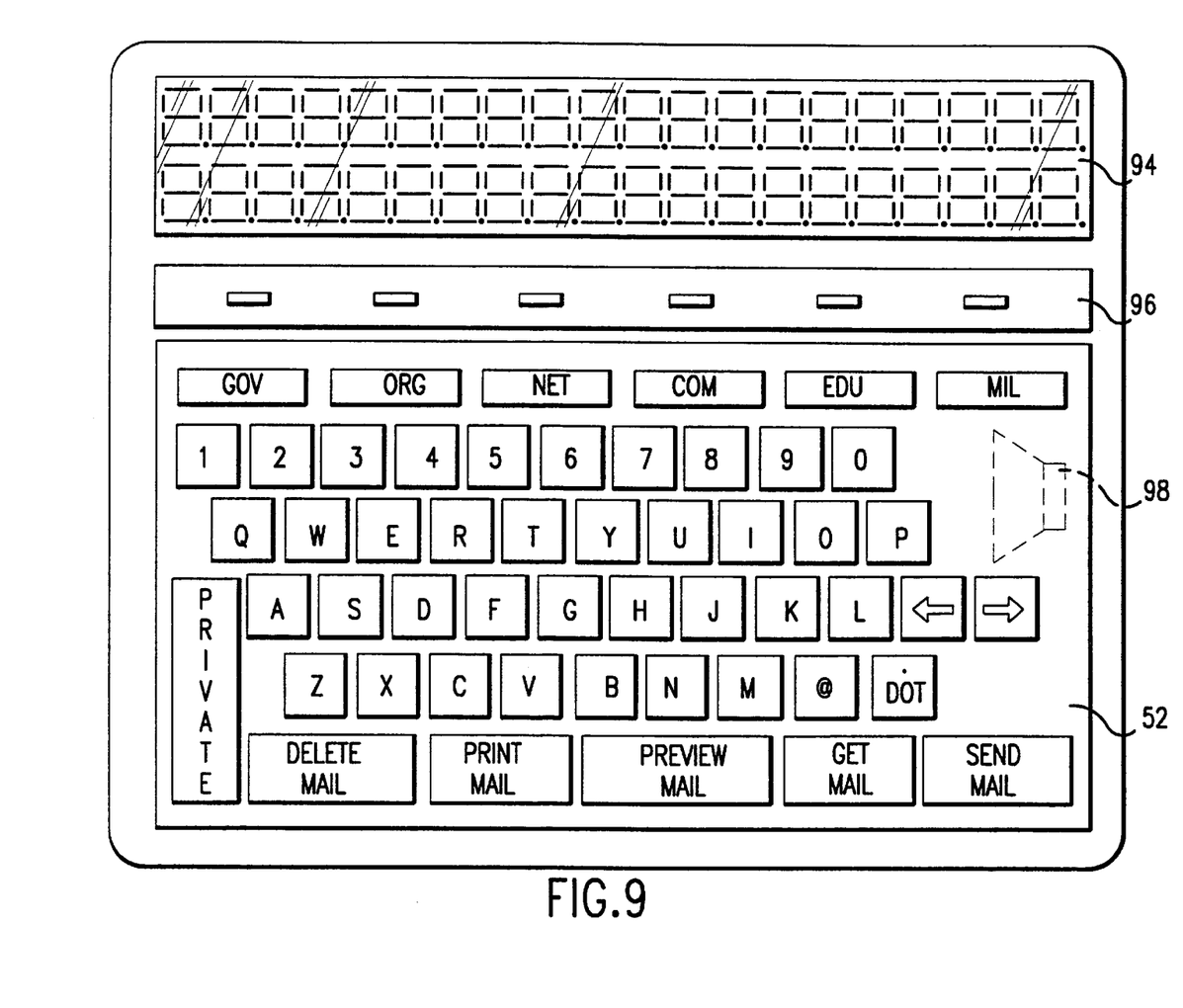
FIG. 9 is a view of a keypad for controlling and operating the present invention.

As may be seen in FIGS. 8 and 9, a keypad 52 is provided to input special instructions, address information and status information such as "e-mail waiting" and the like. From box 52 the converted and formatted data stream is passed to box 54 for final mail agent server phone numbers, send/receive and connect signal functions. The data stream is then ready to be sent dynamically to the selected local agent server 20 resident on the Internet global area networks 12 over a POTS line 18.

Figure 4:
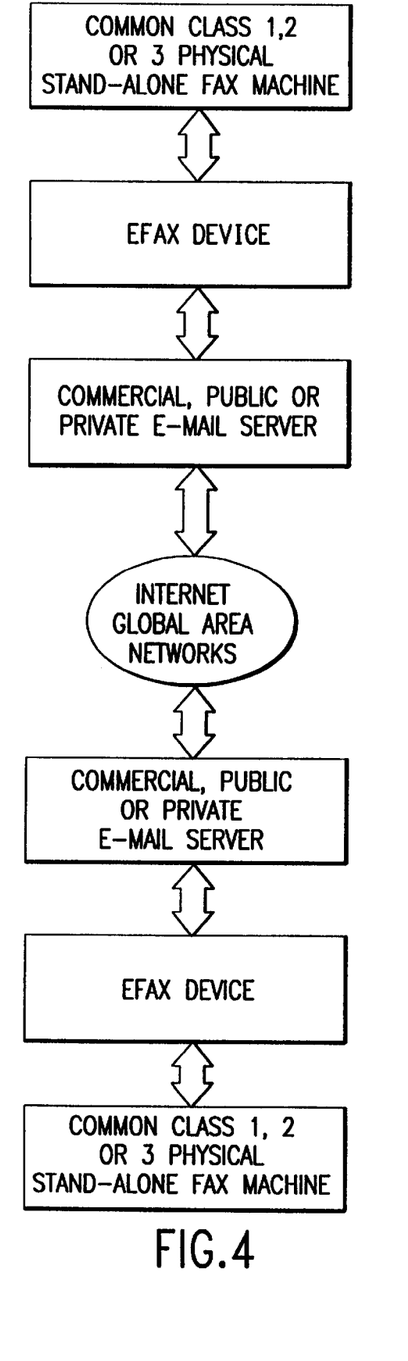
FIGS. 4–7 are flow diagrams of the various operational modes of the present invention.

From this point on the data stream is under the control of the usual global network servers, managers, and providers until it reaches its destination at the remote ecom 16 connected to the addressed remote fax machine 26. The flow diagram shown in FIG. 4 illustrates this sequence of operations.

While I have shown the ecom 16 connected to the server 20 by a telephone line any transport mechanism can be used to transmit the data stream to/from the Internet global area network server 20 such as cellular, satellite, microwave and broadcast.

Figure 5:
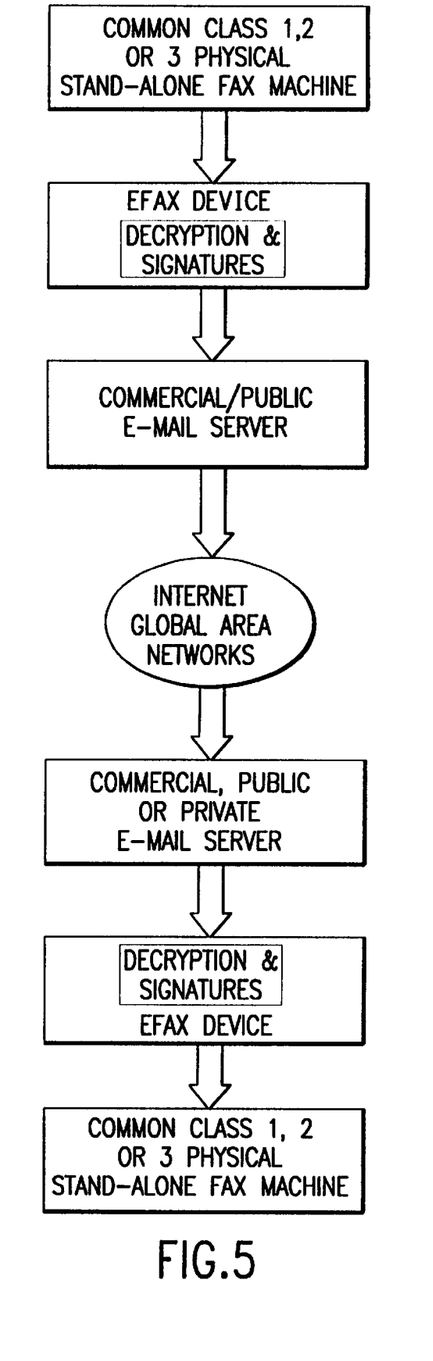

In the event encryption is indicated the converted data stream is routed through box 48 from box 46 and then to electronic mail agent 50. The flow diagram in FIG. 5 illustrates this sequence.

Figure 6:
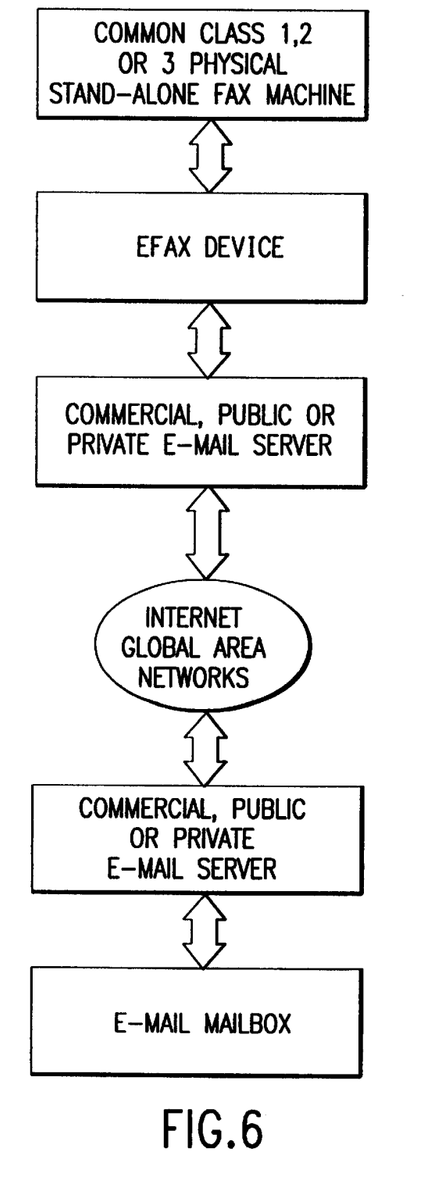

Referring now to FIGS. 2 & 6 there is shown another embodiment of the present invention where the local fax machine 14 can transmit an image to a remote computer. In this configuration since the converted data stream received at server 22 is in e-mail format it can be sent directly to a computer 40 which with the proper modem can store, display and print out the transmitted document.

Figure 7:
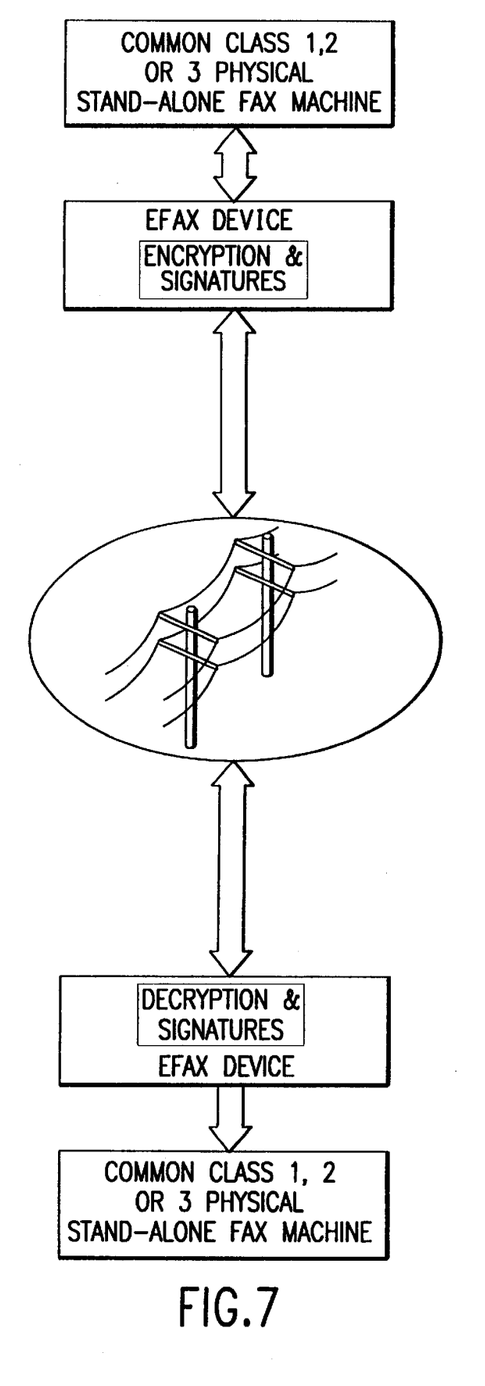

FIG. 7 is a flow diagram of a still further embodiment of the present invention in which it is only desired to encrypt a conventional fax transmission. In this configuration the ecom device 16 processes, converts, and encrypts the data stream but then bypasses the agent and sends the signal directly to the POTS line which is also connected to the remote ecom 16 and fax machine 26. The data stream is received by the remote ecom which decrypts it and prints it out on the remote fax machine.

FIG. 8 is a schematic block diagram of the ecom 16 showing the general layout and interconnection of the various components making up the ecom 16. Lines 15 from the physical stand alone fax machines 14 and 26 are connected to the bus 60 in ecom 16. Bus 60 connects all of the components together and to the output POTS lines 18 or 24. Modems 62 and 84 serve as input and output modems during transmission and the reverse for reception of data. CPU 72 contains the instruction sets needed to run the ecom and may be a 386 DX/33 MHz chip. ASIC chip 64 along with EPROM 68 contain the software instruction sets for the CPU and the TCP/IP,SMTP,MTA protocols and the algorithms for converting the class 1, 2, and 3 fax data stream (Phase C11 data) into a commercial and/or public MIME enabled electronic mail format. EPROM 70 is a mail user agent that contains the commercial and/or public mail boxes and EPROM 66 is a flash EPROM containing the encryption/decryption algorithms. RAMS 74, 76, and 78 provide for storing and forwarding data to the ASIC and CPU chips and to the facsimile and e-mail data streams. Converter block 88 is an analog to digital converter which encapsulates the converted fax image data stream into MIME digital format and vice versa. Block 80 provides compression/decompression operations on the data streams. UART block 90 is a universal asynchronous transmitter/receiver chip for transferring the keypad 52 entered commands to the foregoing components and to the displays 94 and 96. which indicate system status. A voice chip 92 and speaker 98 and auxiliary port 102 may also be provided. The fax machine and POTS lines are connected through standard RJ11 connectors. The power supply 30, which may be housed within ecom 16 if desired as shown in FIG. 8, takes standard AC power and converts it to the necessary line tone/ring generator, DC and other voltages necessary for running the ecom 16. An on/off switch 100 turns the ecom on and off.

Referring now to FIG. 9 the keypad 52 has the usual QWERTY keyboard and the usual numerals 1 through 0. In addition there are provided special function keys that combine several key stroke commands of the usual computer into single stroke keys for the particular functions. Thus the @ key, the Dot key, for addressing e-mail; COM for commercial, NET for network, EDU for education, ORG for other organizations, MIL for military, and GOV for government, provide quick accurate domain addressing; SEND MAIL, GET MAIL, PREVIEW MAIL, DELETE MAIL, PRINT, for the obvious operations and PRIVATE for coding transmissions are also provided.

To send a fax from a local to a remote fax machine over the Internet global area networks according to the present invention the following dynamic sequence takes place:

The user inputs the e-mail address of the selected remote fax machine via the keypad 52. The LCD 94 displays, via the UART 90 this input. The user then depresses the SEND MAIL key. If native fax data is present in the memory buffer the CPU instruction set begins conversion of the data together with the ASIC 64 into e-mail Mail User Agent format. If no native fax data is present in memory then the LCD 94 displays a "waiting for fax" default message. The modified data is compressed via box 80 and the CPU checks to see if encryption is indicated. If encryption is required the CPU instructs the ASIC 64 with EPROM 70 to perform the encryption and stores the result in memory. The LCD 94 then indicates "mail is ready for delivery". The user then presses SEND MAIL again and the CPU retrieves the e-mail server telephone number stored in EPROM or RAM and initializes modem 84, converter 88 and DSP 82 and via the LTG 86 dials the proper phone number. After the proper return codes and hand shake is completed with the e-mail server the CPU sends the e-mail stored in the buffer and clears the buffer. Upon receipt of proper server return codes that the message has been received the CPU instructs the modem 84 to close and the ecom is returned to ready for further traffic.

At the receiving end after transmitting the Internet global area networks the data manipulation sequence in the remote ecom is essentially the reverse of that just described. In addition a user of the ecom can query its mail server to see if there is fax e-mail waiting that could not be delivered previously. Also e-mail other than converted fax image data can be printed out on a fax machine attached to an ecom device. The user presses GET MAIL which displays the command on LCD 94 and then the CPU instructs the appropriate EPROM to retrieve the appropriate server phone number and to dial same via the modem 86. After proper identification and handshake if there is mail the server will send it to the MUA EPROM 70 and the CPU will then send it to memory buffer and terminate connection to the server. The usual "preview mail" capability can also be included in ecom 16 if desired.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

What is claimed:

1. An apparatus for transmitting and receiving class 1, 2, 3 and other non-digital facsimile image data over internet global area networks which comprises:

signal recognition means for determining send and receive status information;

an image data compression, store and forward buffer means connected to said recognition means;

conversion means connected to said buffer means for converting class 1, 2, 3 or other non-digital facsimile image data to any MIME enabled electronic mail data format and vice versa;

a MIME compliant electronic mail agent connected to said conversion means;

user identification means connected to said MIME compliant electronic mail agent associated with storing, sending, and receiving functions;

electronic management means connected to said user identification means for input of address information, send and receive instructions, control information, and apparatus status information; said electronic management means including a processor for implementing fax and e-mail address functions, send and receive functions, and mail server query functions in accordance with the input information and instructions, and stored software instructions; and output means connected to said electronic management means for storing data, and dialing and connecting said apparatus to a mail server associated with said MIME compliant electronic mail agent resident on the selected internet global area networks.

2. An apparatus according to claim 1 further including encryption means connected to said conversion means and said MIME complaint electronic mail agent for selectively encoding and decoding said any MIME enabled electronic mail data format.

3. An apparatus according to claim 2 further including a public and private two key encryption and decryption means together with means for accessing and retrieving a public key from a private address book.

4. An apparatus according to claim 3 wherein said encryption and decryption means includes an attachment MIME/MOSS extender.

5. An apparatus according to claim 1 wherein said MIME complaint electronic mail agent is a commercial mail agent and said mail server resident on the internet global area networks is a commercial server for said agent.

6. An apparatus according to claim 1 wherein said MIME complaint electronic mail agent is a public mail agent and said mail server resident on the internet global area network is a public server.

7. An apparatus according to claim 1 wherein said output means includes circuitry to store data, dial said mail server, and operatively connect the apparatus via said mail server resident on the internet global area network to a remote mail agent connected via a remote mail server to said Internet Global Area Network.

8. An apparatus according to claim 7 wherein said electronic management means includes a keypad input device having at least means for input of said send and receive functions; said fax and e-mail address functions; said mail server query functions; and private address book and fax machine query functions for commanding operation of said apparatus.

9. An apparatus according to claim 8 further including an RJ 11 input terminal connected to said signal recognition means for operatively connecting said apparatus to a class 1, 2, 3 or other non-digital facsimile machine standard output terminal.

10. An apparatus according to claim 9 further including an RJ 11 output terminal connected to said output means for operatively connecting said apparatus via a POTS line to said mail server resident on the internet global area networks.

11. An apparatus according to claim 10 wherein said apparatus is powered by a separate DC voltage power supply operatively connected thereto and adapted to be connected to a standard commercial AC power source.

12. An apparatus according to claim 1 wherein said conversion means includes electronic means for attaching and detaching native facsimile images to said any MIME enabled electronic mail data format created by said conversion means for transmission and reception over the internet global area networks.

13. An apparatus according to claim 12 wherein said electronic means includes e-mail extender MIME protocol.

14. An apparatus as claimed in claim 1 wherein said electronic management means includes an electronic keyboard having at least the following operating keys:
a QWERTY keyboard;
a 1 through 0 keyboard;
domain keys COM, NET, EDU, ORG, GOV, and MIL:
function keys SEND MAIL, GET MAIL, PREVIEW MAIL, DELETE MAIL, PRIVATE, and PRINT:
addressing keys @, DOT;
each of said keys causing upon actuation all the necessary electronic operations for accomplishing the indicated command within the apparatus.

15. An system for transmitting facsimile images from a first, class 1, 2, to 3 or other non-digital fax machine across the internet global area networks to a second, class 1, 2, 3 or other non digital fax machine which comprises in combination:
a first device connected between a first fax machine and a local mail server resident on the Internet global area networks comprising:
signal recognition means connected to said first fax machine for determining send and receive status information;
an image data compression, store and forward buffer means connected to said recognition means;
conversion means connected to said buffer means for converting class 1, 2, 3 or other non-digital facsimile image data to any MIME enabled electronic mail data format and vice versa;
a MIME compliant electronic mail agent connected to said conversion means;
user identification means for connected to said electronic MIME complaint mail agent associated with storing, sending, and receiving functions;
electronic management means connected to said user identification means for input of address information, send and receive instructions, control information, and apparatus status information; said electronic management means including a processor for implementing fax and e-mail address functions, send and receive functions, and mail server query functions in accordance with the input information and instructions, and stored software instructions; and
output means connected to said electronic management means for storing data, and dialing and connecting said apparatus to said local mail server resident on the internet global area networks;
a second device connected between a second remote fax machine and a remote mail server resident on the internet global area networks comprising;
signal recognition means connected to said remote fax machine for determining send and receive status information;
an image data compression and decompression, store and forward buffer means connected to said recognition means;
conversion means connected to said buffer means for converting class 1, 2, 3 or other non-digital facsimile image data to any MIME enabled electronic mail data format and vice versa;
a MIME compliant electronic mail agent connected to said conversion means;
user identification means connected to said electronic mail agent associated with storing, sending, and receiving functions;
electronic management means connected to said user identification means for input of address information, send and receive instructions, control information, and apparatus status information; said electronic management means including a processor for implementing fax and e-mail address functions, send and receive functions, and mail server query functions in accordance with the input information and instructions, and stored software instructions; and
output means connected to said electronic management means for storing data, and dialing and connecting said second device to said remote mail server resident on the internet global area networks;
whereby input to said first fax machine can be transmitted to said second fax machine over the Internet global area networks and input to said second fax machine can be transmitted to said first fax machine over the Internet global area networks.

16. An apparatus system according to claim 15 further including encryption and decryption means connected to said conversion means and said MIME complaint electronic mail agents of each of said first and second devices for selectively encoding and decoding said any MIME enabled electronic mail data format.

17. An apparatus system according to claim 16 further including a public and private two key encryption and decryption means together with means for accessing and retrieving a public key from a private address book.

18. An apparatus system according to claim 15 wherein said MIME complaint electronic mail agents and said mail servers of said first and second devices are commercial mail agents and commercial mail servers resident on the Internet Global Area Network.

19. An apparatus system according to claim 15 wherein said electronic management means in said first and second devices includes a get mail query means for getting electronic mail stored in said local and remote mail servers printed out on said first and second class 1, 2, 3 and other non-digital fax machines.

20. An apparatus system according to claim 19 wherein said query means includes mail preview means for reviewing stored mail and printing out only selected items.

21. An apparatus according to claim 15 wherein said electronic management means for said first and second devices operates in accordance with TCP/IP protocols.

22. A system for transmitting and receiving class 1, 2, 3 and other non digital facsimile image data over the Internet global area networks which comprises an apparatus connected to the output of a fax machine having the following components operatively connected together on a bus between said fax machine input and a POTS line output:
means for converting class 1, 2, 3 or other non-digital facsimile image data to a MIME enabled e-mail data streams;
an analog to digital converter for encapsulating said MIME enabled e-mail into MIME e-mail digital format;
high speed RAM for storing and forwarding native fax data to CPU and ASIC means for conversion to said MIME enabled e-mail data streams;
a plurality of digital signal processors for formatting said MIME enabled e-mail data streams;

at least one EPROM containing a commercial, private, and/or public MIME compliant e-mail agent;

a UART for transferring keypad entered addressing information, and encoding and operating commands to a display module for displaying status information;

an ASIC chip programmed with translation algorithms for converting phase C11 data into commercial and or public e-mail format, in both forward and reverse directions;

a digital to analog converter;

a transmitting modem and a receiving modem;

a line tone and ring generator; and a CPU controlling and directing the flow and processing of data within the system.

23. A system according to claim 22 further including a flash EPROM containing signature and encryption/decryption, two key algorithms for the coding/decoding of facsimile to facsimile, e-mail to facsimile, and facsimile to e-mail data streams.

24. A system according to claim 23 wherein said EPROM contains a public key query instruction set.

25. The method of transmitting and receiving class 1, 2, 3 or other non-digital facsimile image data over non-facsimile image data compatible networks from a local fax machine to a selected remote fax machine and vice versa using the apparatus of claim 1 which comprises:

storing the image data stream from a local transmitting class 1, 2, 3 or other non-digital fax machine in a local store and forward buffer;

converting the image data stream in said buffer to a MIME enabled electronic data format compatible with the network over which the converted image data stream is to be sent;

connecting a local MIME complaint electronic mail agent directly to said store and forward buffer and to a local mail server for the local mail agent resident on the network over which the converted image data stream is to be sent;

connecting a remote store and forward buffer to said selected remote fax machine;

connecting a selected remote MIME compliant electronic mail agent to said remote store and forward buffer and to a selected remote mail server for the remote mail agent resident on the network over which the fax is to be sent;

sending the converted image data stream over a non-facsimile image data compatible network together with address and user identification information to said selected remote mail server resident at a remote location on the network serving said selected remote mail agent;

receiving and storing said converted image data stream in said remote store and forward buffer, connected to said selected remote fax machine;

reconverting said received and stored converted image data stream image data stream into class 1, 2, 3 or other non-digital facsimile image data;

printing out the reconverted image data on said selected remote fax machine.

26. The method as claimed in claim 25 further including querying said remote mail server for the presence of stored mail data; and printing out on said remote fax machine said reconverted image data for the mail data selected from that stored in said remote mail server.

27. The method as claimed in claim 25 further including converting the image data stream in said local store and forward to a commercial compatible MIME enabled electronic mail data format; and connecting a commercial MIME compliant electronic mail agent to said local store and forward buffer directly and to a commercial mail server resident on the network over which the converted image data stream is to be sent.

28. The method as claimed in claim 25 further including converting the facsimile image data stream from a local transmitting class 1, 2, 3 or other non-digital fax machine to an e-mail data stream format;

connecting said local MIME complaint electronic mail agent to an e-mail server resident on the Internet global area networks; and sending said converted converted data stream to said selected remote fax machine store and forward buffer over the Internet global area networks Network.

29. The method as claimed in claim 25 further including converting the facsimile image data stream from a local transmitting class 1, 2, 3 or other non-digital fax machine to a private data stream format;

connecting said local MIME complaint electronic mail agent to a private server resident on the Internet global area networks; and sending said converted private data stream to said selected remote fax machine buffer store and forward over the Internet global area networks.

30. The method as claimed in claim 25 further including converting the facsimile image data stream in said local store forward buffer to commercial and public compatible data format;

connecting said local store and forward buffer to a selected commercial or public MIME complaint electronic mail agent and corresponding mail server resident on the Internet global area networks;

sending said converted image data stream over the Internet global area networks to a selected remote MIME compliant electronic mail agent and remote mail server corresponding in kind to the selected commercial or public MIME complaint electronic mail agent and mail server at the sending fax machine; and connecting said selected remote commercial or public MIME complaint electronic mail agent to said store and forward buffer connected to said selected remote fax machine.

31. The method as claimed in claim 25 further including encrypting the converted image data stream;

sending the encrypted data stream to said selected remote mail server; and decrypting the encrypted data stream received and stored in said remote store and forward buffer before reconverting said data stream converted image to facsimile image data.

32. In a system for transmitting and receiving class 1, 2, 3 or other non-digital facsimile image data over non-facsimile image data compatible networks connecting a local fax machine to a selected remote fax machine having a facsimile image data processing apparatus connected at the local and remote fax machines comprising;

signal recognition means for determining send and receive status information;

an image data compression, store and forward buffer means connected to said recognition means;

conversion means connected to said buffer means for converting class 1, 2, 3 or other non-digital facsimile image data to any MIME enabled electronic mail data format and vice versa;

a MIME complaint electronic mail agent connected to said conversion means;

encryption means connected to said conversion means and said MIME complaint electronic mail agent for selectively encoding and decoding said converted facsimile image data and having a public and private two key encryption and decryption means together with means for accessing and retrieving a public key from a private address book;

user identification means connected to said electronic MIME complaint mail agent associated with storing, sending, and receiving functions;

electronic management means connected to said user identification means for input of address information, send and receive instructions, control information, and apparatus status information; said electronic management means including a processor for implementing fax and e-mail address functions, send and receive functions, and mail server query functions in accordance with the input information and instructions, and stored software instructions; and output means connected to said electronic management means for storing data, and dialing and connecting said apparatus to a mail server resident on a global area network:

the system for sending converted and encrypted facsimile image data from a local to a remote fax machine which comprises:

means for alternatively bypassing at both the local and remote locations said MIME compliant mail agent in the facsimile image data processing apparatus and providing functions of the conversion means, encryption and decryption means, signal recognition means, compression store and forward buffer means, electronic management means, and output means; and means for connecting the facsimile data processing apparatus connected to said local fax machine and said remote facsimile image data processing apparatus connected to said selected remote fax machine directly over a POTS line for transmission of converted and encrypted facsimile image data.

33. An apparatus for receiving facsimile data from a Class 1, 2, 3 or other non-digital facsimile machine and packaging said facsimile data for delivery to an intended recipient over a computer network, said apparatus comprising:

a facsimile data receiver adapted to be connected to said facsimile machine and receives from said facsimile machine said facsimile data and the telephone number of said intended recipient of said facsimile data;

a delivery address device coupled to said facsimile data receiver for deriving delivery address information from said telephone number;

an image data restore device coupled to said facsimile data receiver for restoring said facsimile data to native facsimile image data;

MIME complaint electronic mail agent coupled to said delivery address device and to said image data restore device for converting said delivery address information and said native facsimile image data to any MIME enabled electronic mail compatible format;

user identification means connected to said MIME compliant electronic mail agent associated with storing, sending, and receiving functions;

electronic mail management means connected to said user identification means for input of address information, send and receive instructions, control information, and apparatus status information; said electronic management means including a processor for implementing fax and e-mail address functions, send and receive functions, and mail server query functions in accordance with the input information and instructions, and stored software instructions; and a transmission device coupled to said MIME complaint electronic mail agent for transmitting an electronic mail message carrying said native facsimile image data to said computer network for delivery to the intended recipient.

34. The apparatus of claim 33 further including a data security encoding device coupled to said image data restore device for encoding said native facsimile image data in accordance with an encoding code.

35. The apparatus of claim 33 further including an encryption device coupled to said image data restore device for encoding said native facsimile image data in accordance with an encryption code.

36. The apparatus of claim 33 wherein said electronic mail agent converts said delivery address information and said native facsimile image data to a MIME compatible electronic mail format.

37. The apparatus of claim 33 wherein said MIME complaint electronic mail agent converts said delivery address information and said native facsimile image data to a MOSS compatible electronic mail format.

38. The apparatus of claim 33 further including a compression device coupled to said image data restore device for compressing said native facsimile image data, wherein said data compression device compresses said native facsimile image data without loss of data content.

39. The apparatus of claim 38, wherein said data compression device compresses said facsimile data in accordance with a format selected from among the group consisting of JPEG, GIF, TIFF, MPEG and their extensions.

40. The apparatus of claim 33 further including a receiving device coupled to said MIME complaint electronic mail agent for receiving an electronic mail message carrying native facsimile image data from said computer network, wherein said MIME compliant electronic mail agent includes means for converting said received native facsimile image data to a displayable form for display on a remotely located printer.

41. The apparatus of claim 33 further including a receiving device coupled to said MIME complaint electronic mail agent for receiving an electronic mail message carrying native facsimile image data from said computer network, wherein said MIME compliant electronic mail agent includes means for converting said received native facsimile image data to a displayable form for display on a computer display screen.

* * * * *